United States Patent Office 3,465,601
Patented Sept. 9, 1969

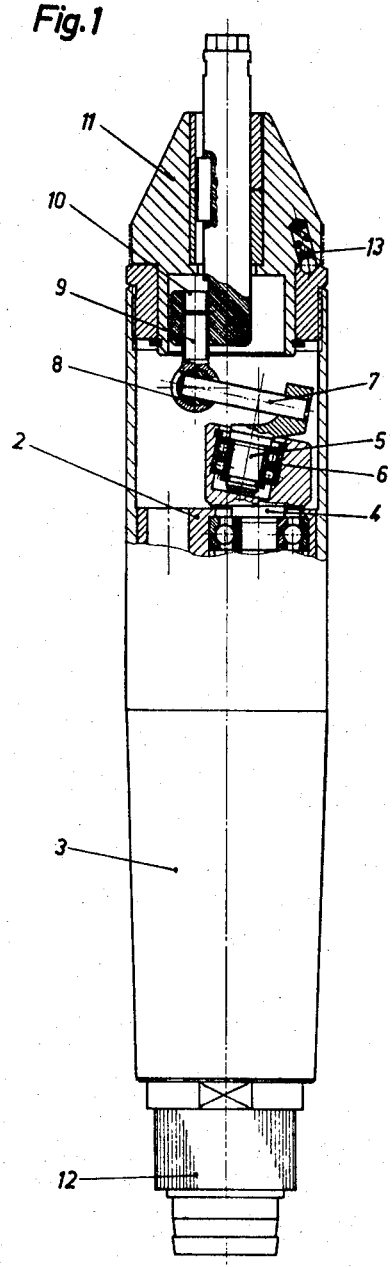
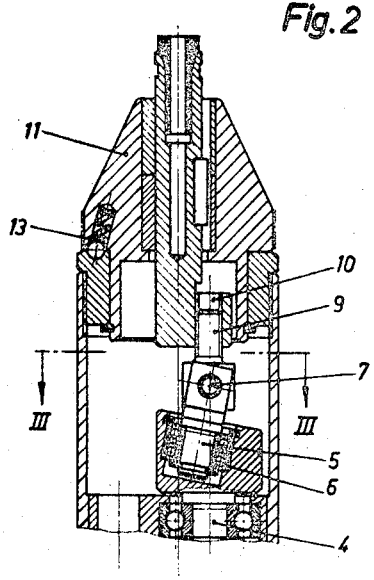
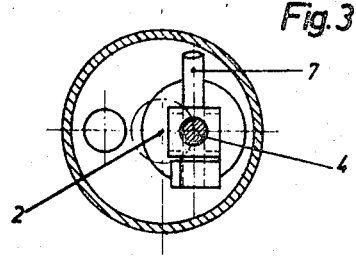
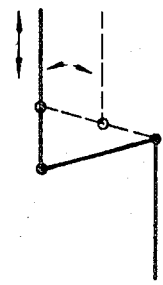
INVENTORS
Hans Wezel
& Kurt Schuhmann

3,465,601
IMPLEMENT FOR RECIPROCATING A TOOL
WITH AN ADJUSTABLE STROKE
Hans Wezel, Maulbronn, and Kurt Schuhmann, Knittlingen, Germany, assignors to Schmid & Wezel, Maulbronn, Germany
Filed Nov. 28, 1967, Ser. No. 686,271
Claims priority, application Germany, Sept. 14, 1967,
Sch 41,308
Int. Cl. F16h *21/20;* B23d *67/04, 69/00*
U.S. Cl. 74—45                                4 Claims

ABSTRACT OF THE DISCLOSURE

A crank arm is carried at one end of a shaft, which is power-operable to rotate about its axis. A crankpin is rotatably mounted in said crank arm and extends at acute angles to said shaft axis and to the head axis of a reciprocable tool-gripping head. A coupling pin is carried by said crankpin and extends at right angles to the axis of rotation of said crankpin. A bearing eye is axially slidably mounted on the coupling pin and is connected to an eccentric, which is coupled to said tool-gripping head for movement in the direction of said head axis and which is rotatable about said head axis to change the position of said bearing eye on said coupling pin, whereby a rotation of said shaft causes said tool-gripping head to reciprocate to an extent which depends on the position of said bearing eye on said coupling pin.

---

The invention relates to a stroke-adjusting device for an electrically or preferably pneumatically operated implement having a reciprocating tool, particularly for a reciprocating filing implement.

Hand-held implements having a reciprocating tool, particularly reciprocating filing implements, having a variable stroke, are known, e.g., from the German patent specifications Nos. 1,211,899 and 1,039,334. In the known implements, a special wrench, screwdriver or the like is required for an adjustment of the stroke.

The device according to the invention enables an adjustment of the stroke of the reciprocating tool by a rotation of the tool-gripping head. With special advantage, it is possible in such implement to utilize the concept, known per se, to change the speed of the tool by the rotation of a knob which is provided at that end of the implement which is remote from the tool-gripping head.

An adjustment of the stroke by a rotation of the tool-gripping head is enabled in the implement according to the invention by a crankpin, which is rotatably inserted in the end crank arm and extends at an acute angle to the axis of the shaft and carries a coupling pin, which extends at right angles to the axis of rotation of the crankpin and on which a bearing eye is axially slidable by an eccentric carried by the tool-gripping head.

A rotation of the shaft through 180° causes a change of the angle between the axis of the coupling pin and the shaft axis by twice the angle between the axis of the end crankpin and the shaft axis so that the bearing which embraces the coupling pin and with it the tool is displaced in the axial direction of the shaft by an amount which depends on the eccentricity of the bearing. If this eccentricity is variable according to the invention by a rotation of the gripping hand, the length of the stroke of the tool is variable too.

The drawing shows diagrammatically and by way of example a preferred embodiment of the invention as applied to a reciprocating filing device operated by compressed air.

The invention can be similarly applied to all reciprocating hand-held implements, which may be operated electrically or pneumatically.

The drawing shows a preferred embodiment of a filing implement provided with a stroke adjusting device according to the invention.

FIG. 1 is a longitudinal sectional view showing a filing implement with the tool in one stroke end position.

FIG. 2 is a sectional view which is similar to FIG. 1 but shows the tool in the other stroke end position.

FIG. 3 is a sectional view taken on line III—III of FIG. 2; and

FIG. 4 is a diagram to explain the calculation.

With reference to the drawing, a shaft 2 is rotated by a motor 3 and carries a crank arm 4, in which an end crankpin 5 is rotatably mounted in roller bearings 6. An L-shaped arm carries a coupling pin 7, which extends at right angles to the pin 5. A rotation of the shaft 2 and of the crankpin 4 through 180° changes the position of the coupling pin 7 relative to the shaft 2 from the position of FIG. 1 to that of FIG. 2. During the rotation of the crank arm 4, those points of the pin 7 which are most remote from the shaft 2 are moved the largest distances in the axial direction of the shaft 2.

The coupling pin 7 is embraced by an eye 8 of a bearing pin 9, which is screw-threaded in a tapped eccentric hole 10 in the head 11 for gripping the tool. Owing to the eccentricity of the tapped hole, a rotation of the gripping head 11 about its axis will result in a radial displacement of the tapped hole 10 and of the pin 9 with respect to the axis of the head 11. This axis coincides with the axis of the shaft 2. The radial displacement of the pin 9 results in a displacement of the eye 8 on the pin 7 in the axial direction of the latter. The eye 8 can thus be adjusted to any desired radial distance from the axis of the shaft 2.

In accordance with the above, the length of the stroke is a function of the radial distance of the eye 8 from the axis of the shaft 2 so that the length of the stroke of the tool can be adjusted by a rotation of the tool-gripping head 11.

A detent 13 is provided to prevent a spontaneous change of the length of stroke. With this detent, the length of stroke can be adjusted only in steps.

The knob 12 can be rotated to change in known manner the speed (frequency) of the motion of the tool.

What is claimed is:

1. An implement for operating a reciprocable tool, said implement comprising:
    a shaft which defines a shaft axis and is power-operable to rotate about the same,
    a crank arm carried by said shaft at one end thereof,
    a tool-gripping head defining a head axis and reciprocable along said head axis,
    a crankpin rotatably mounted in said crank arm and extending at acute angles to said shaft axis and said head axis,
    a coupling pin carried by said crankpin and extending at right angles to the axis of rotation of said crankpin,
    a bearing eye axially slidably mounted on said coupling pin,
    an eccentric which is coupled to said tool-gripping head for movement in the direction of said head axis and connected to said bearing eye and rotatable about said head axis to change the position of said bearing eye on said coupling pin, whereby a rotation of said shaft causes said tool-gripping head to reciprocate to an extent which depends on the position of said bearing eye on said coupling pin.

2. An implement as set forth in claim 1, in which:
   said tool-gripping head has a tapped hole, which is parallel and eccentric with respect to said head axis and open toward said shaft, and
   a bolt is threaded into said tapped hole and connected to said bearing eye to shift the same radially along said coupling pin upon a rotation of said tool-gripping head.

3. An implement as set forth in claim 1, which comprises means for defining steps in the rotation of said eccentric.

4. An implement as set forth in claim 1, in which said bearing eye forms part of a universal joint, which is adapted to take up the change of the angle between said coupling pin and said head axis during the rotation of said shaft.

References Cited

UNITED STATES PATENTS

| | | | |
|---|---|---|---|
| 743,147 | 11/1903 | Church | 74—45 |
| 939,669 | 11/1909 | Cole | 74—45 |
| 1,359,020 | 11/1920 | Beshara | 74—45 |
| 2,307,174 | 1/1943 | Wachs | 74—50 |
| 3,204,470 | 9/1965 | Brucker | 74—50 |

FRED C. MATTERN, Primary Examiner

W. S. RATLIFF, JR., Assistant Examiner